(12) United States Patent
Okada et al.

(10) Patent No.: US 10,520,218 B2
(45) Date of Patent: Dec. 31, 2019

(54) FLUID HEATING DEVICE FOR ENGINE

(71) Applicant: KUBOTA Corporation, Osaka-shi, Osaka (JP)

(72) Inventors: Koji Okada, Sakai (JP); Yasuo Fujii, Sakai (JP); Mikio Ishida, Sakai (JP)

(73) Assignee: KUBOTA Corporation, Osaka-Shi, Osaka (JP)

( * ) Notice: Subject to any disclaimer, the term of this patent is extended or adjusted under 35 U.S.C. 154(b) by 874 days.

(21) Appl. No.: 14/813,717

(22) Filed: Jul. 30, 2015

(65) Prior Publication Data

US 2016/0033165 A1  Feb. 4, 2016

(30) Foreign Application Priority Data

Jul. 31, 2014  (JP) .................................. 2014-156754

(51) Int. Cl.
*F24H 1/14*  (2006.01)

(52) U.S. Cl.
CPC .................................. *F24H 1/142* (2013.01)

(58) Field of Classification Search
CPC ...... F24H 1/009; F24H 1/0018; F24H 1/0027; F24H 1/101; F24H 1/102; F24H 1/105; F24H 1/107; F24H 1/121; F24H 1/14; F24H 1/142; F24H 1/145; F24H 1/16; F24H 1/162; F24H 9/001; F24H 9/0015; F24H 9/0021; F02M 31/125
USPC ....... 392/465, 466, 468, 470, 472, 478–483, 392/485–488, 490–492
See application file for complete search history.

(56) References Cited

U.S. PATENT DOCUMENTS

| 5,944,090 A | * | 8/1999 | Teal | F28D 21/0008 165/47 |
| 2006/0144376 A1 | * | 7/2006 | Gschwind | F01M 13/00 123/573 |
| 2008/0251241 A1 | * | 10/2008 | Yusa | F28D 7/106 165/154 |

(Continued)

FOREIGN PATENT DOCUMENTS

| CN | 103697740 A | 4/2014 |
| DE | 19846282 A1 | 4/2000 |

(Continued)

OTHER PUBLICATIONS

Extended Search Report dated Mar. 1, 2016 in EP Application No. 15176992.4.

(Continued)

*Primary Examiner* — Ibrahime A Abraham
*Assistant Examiner* — Justin C Dodson
(74) *Attorney, Agent, or Firm* — Panitch Schwarze Belisario & Nadel LLP

(57) ABSTRACT

There is provided a fluid heating device for an engine with increased heating efficiency of fluid. The fluid heating device for an engine includes: a holder; a heater; and a radiator pipe, the radiator pipe is inserted into the holder, the heater is housed in the holder, heat of the heater is radiated to fluid passing through the radiator pipe via the radiator pipe. The radiator pipe is formed by an outer pipe and an inner pipe in the outer pipe, the heat generated by the heater is transferred to the outer pipe and the inner pipe, the fluid passing inside and outside the inner pipe in the outer pipe is heated by heat radiation from the outer pipe and the inner pipe.

10 Claims, 4 Drawing Sheets

(56) References Cited

U.S. PATENT DOCUMENTS

2010/0046934 A1* 2/2010 Johnson .................. F24H 1/121
392/480
2014/0023354 A1* 1/2014 Hankins .................. F24H 1/102
392/480

FOREIGN PATENT DOCUMENTS

| | | |
|---|---|---|
| DE | 102005037183 B3 | 5/2007 |
| EP | 1505135 A1 | 2/2005 |
| JP | 62-136785 U1 | 6/1987 |
| JP | 06-185804 A | 7/1994 |
| JP | 07-324806 A | 12/1995 |
| JP | 10-247585 A | 9/1998 |
| JP | 2006242529 A | 9/2006 |
| JP | 2013-124566 A | 6/2013 |
| JP | 52-81632 U1 | 9/2013 |
| WO | 2014016331 A1 | 1/2014 |

OTHER PUBLICATIONS

Office Action dated Oct. 3, 2017 in JP Application No. 2014-156754.
Office Action dated Feb. 6, 2018 in JP Application No. 2014-156754.
Office Action dated Sep. 26, 2018 in JP Application No. 2014156754.

* cited by examiner

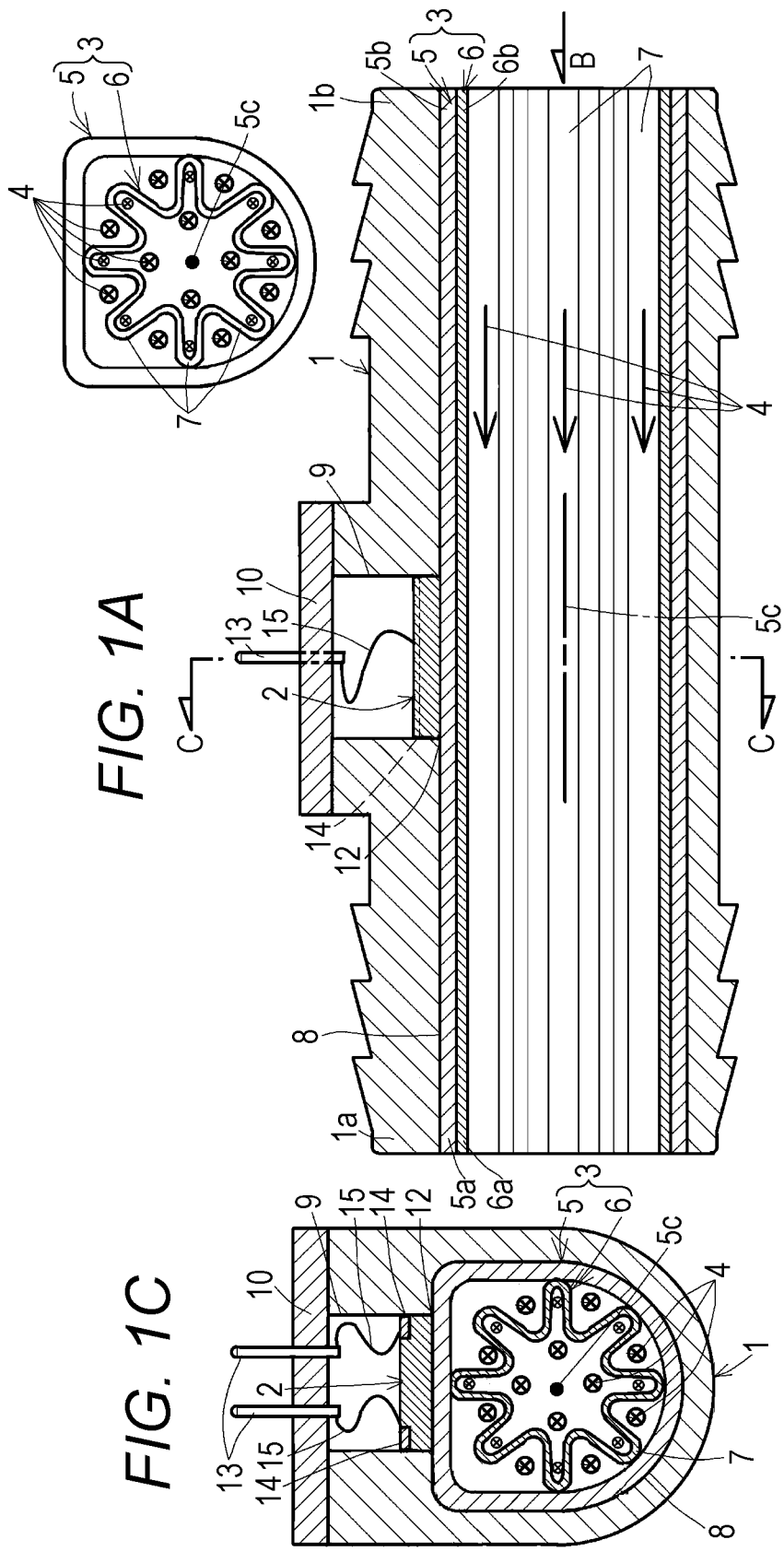

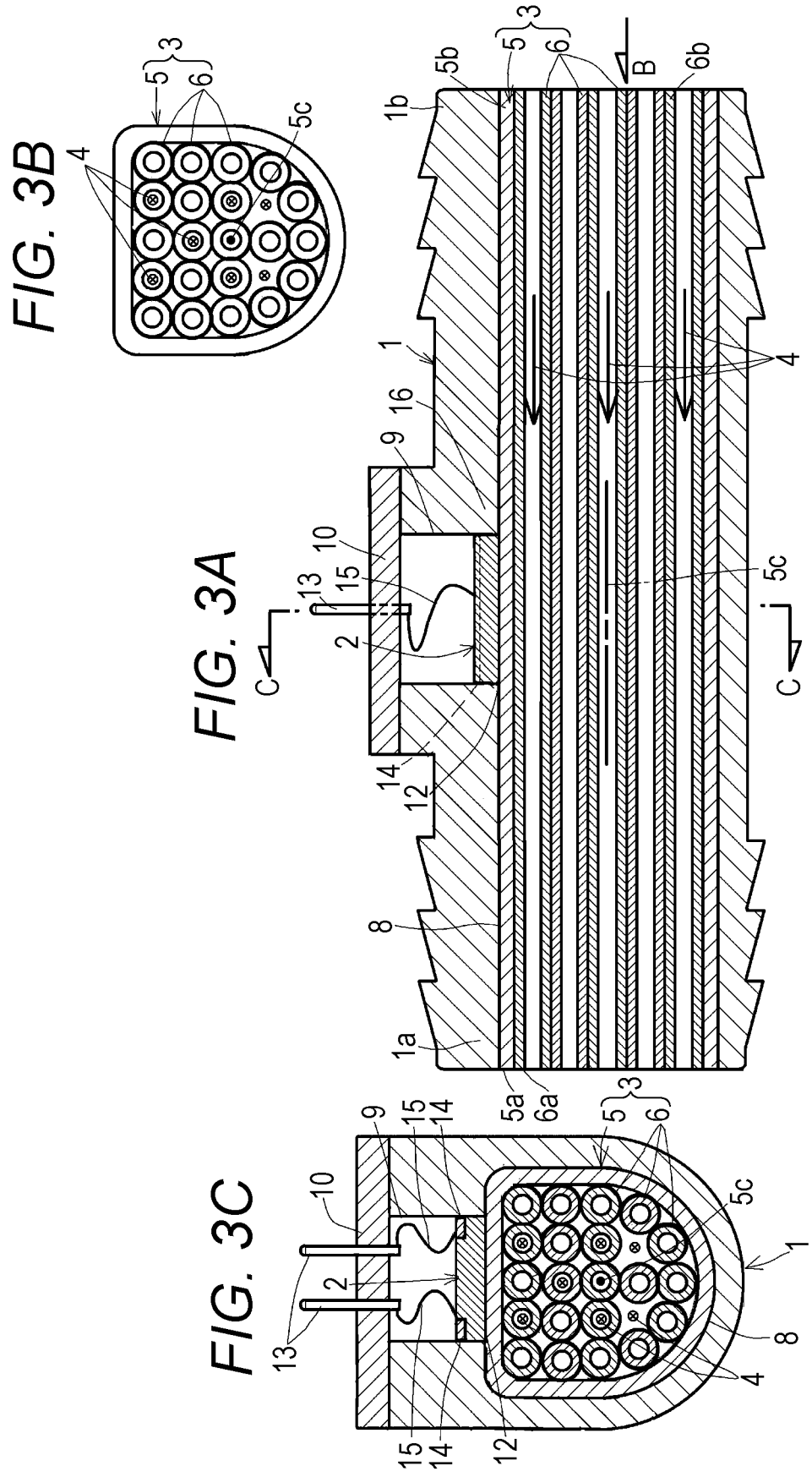

FLUID HEATING DEVICE FOR ENGINE

BACKGROUND OF THE INVENTION (1) Field of the Invention

The present invention relates to a fluid heating device for an engine.

(2) Description of Related Art

Conventionally, as a fluid heating device for an engine, there is a device whose radiator pipe is a single pipe.

In the conventional device, a face for radiating heat to fluid is limited to an inner peripheral face of the single tube, an area for radiating the heat to the fluid is small, and a heat radiation distance from the radiator pipe to the fluid passing through a central portion of the radiator pipe is long, which results in the low heating efficiency of the fluid.

SUMMARY OF THE INVENTION

An object of the present invention is to provide a fluid heating device for an engine with increased heating efficiency of fluid.

Matters specifying the present invention are as follows.

A fluid heating device for an engine includes: a holder; a heater; and a radiator pipe, the radiator pipe is inserted into the holder, the heater is housed in the holder, heat of the heater is radiated to fluid passing through the radiator pipe via the radiator pipe.

The radiator pipe is formed by an outer pipe and an inner pipe in the outer pipe, the heat generated by the heater is transferred to the outer pipe and the inner pipe, the fluid passing inside and outside the inner pipe in the outer pipe is heated by heat radiation from the outer pipe and the inner pipe.

The invention exerts the following effect.

It is possible to secure a large area for radiating heat to the fluid and the heat can be radiated over a short distance to the fluid passing through a central portion of the outer pipe from the inner pipe(s), which increases the heating efficiency of the fluid.

BRIEF DESCRIPTION OF THE DRAWINGS

FIGS. 1A to 1C are diagrams for explaining a basic example of a first embodiment of the present invention, wherein FIG. 1A is a vertical sectional side view, FIG. 1B is a front view of a radiator pipe seen in direction B in FIG. 1A, and FIG. 1C is a sectional view taken along line C-C in FIG. 1A;

FIGS. 2A to 2D are diagrams for explaining variations of the first embodiment of the invention, wherein FIG. 2A is a vertical sectional side view of an essential portion of the first variation, FIG. 2B is a vertical sectional, side view of an essential portion of the second variation, FIG. 2C is a vertical sectional side view of an essential portion of the third variation, and FIG. 2D is a front view of a radiator pipe of a fourth variation;

FIGS. 3A to 3C are diagrams for explaining a basic example of a second embodiment of the invention, wherein FIG. 3A is a vertical sectional side view, FIG. 3B is a front view of a radiator pipe seen in direction B in FIG. 3A, and FIG. 3C is a sectional view taken along line C-C in FIG. 3A; and FIGS. 4A to 4D are diagrams for explaining variations of the second embodiment of the invention, wherein FIG. 4A is a vertical sectional side view of an essential portion of the first variation, FIG. 4B is a vertical sectional side view of an essential portion of the second variation, FIG. 4C is a vertical sectional side view of an essential portion of the third variation, and FIG. 4D is a front view of a radiator pipe of the fourth variation.

DETAILED DESCRIPTION OF PREFERRED EMBODIMENTS

Figure 2A:
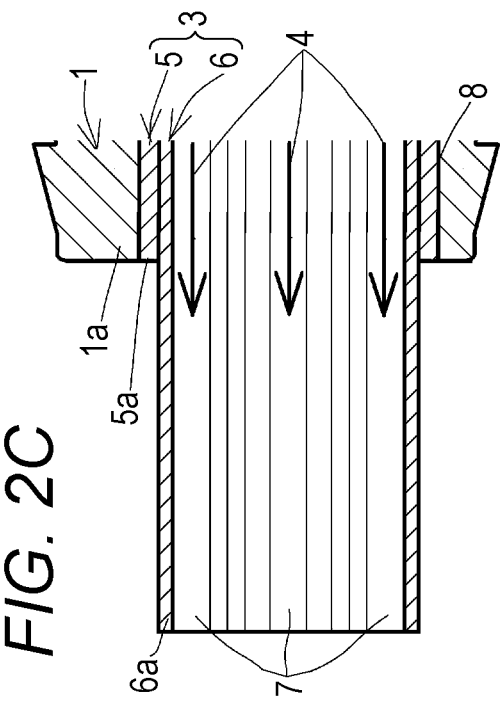

FIGS. 1A to 4D are diagrams for explaining a fluid heating device for an engine according to first and second embodiments of the present invention and a blow-by gas heating device for an engine will be described in each of the embodiments.

A basic example of the first embodiment shown in FIGS. 1A to 1C will be described.

A general outline of the heating device is as follows.

As shown in FIG. 1A, the heating device includes a holder (1), a heater (2), and a radiator pipe (3), the radiator pipe (3) is inserted through a radiator pipe housing portion (8) of the holder (1), the heater (2) is housed in the holder (1), and heat of the heater (2) is radiated to fluid (4) passing through the radiator pipe (3) via the radiator pipe (3).

As shown in FIGS. 1A and 1C, a heater housing hole (9) is formed in a peripheral wall of the cylindrical holder (1), the heater (2) is housed and supported at a bottom position in the heater housing hole (9) and along a heat receiving face (12) of an outer peripheral face of the radiator pipe (3). A lid (10) is attached to the heater housing hole (9), paired terminals (13), (13) are attached to the lid (10), both the terminals (13), (13) are connected to paired electrodes (14), (14) of the heater (2) by wires (15), (15). Connection portions (not shown) of a power cable (not shown) are connected to the paired terminals (13), (13) and electric power is supplied from a battery (not shown) to the heater (2) via the power cable and the paired terminals (13), (13).

As shown in FIGS. 1A to 1C, the radiator pipe (3) is formed by an outer pipe (5) and an inner pipe (6) in the outer pipe (5) and heat generated by the heater (2) is transferred to the outer pipe (5) and the inner pipe (6), the fluid (4) passing inside and outside the inner pipe (6) in the outer pipe (5) is heated by heat radiation from an inner peripheral face of the outer pipe (5) and inner and outer peripheral faces of the inner pipe (6).

Thus, because faces for radiating heat to the fluid (4) are formed by the outer pipe (5) and the inner pipe(s) (6), it is possible to secure a large area for radiating the heat to the fluid (4) and the heat can be radiated over a short distance to the fluid (4) passing through a central portion of the outer pipe (5) from the inner pipe(s) (6), which increases the heating efficiency of the fluid (4).

As shown in FIGS. 1A to 1C, the outer peripheral face of the inner pipe (6) is in contact with the inner peripheral face of the outer pipe (5) so that the heat of the heater (2) is transferred to the inner pipe (6) via the outer pipe (5). Thus, it is possible to simplify the heat transfer route from the heater (2) to the inner pipe(s) (6) by utilizing the outer pipe (5).

As shown in FIGS. 1B and 1C, a peripheral wall of the inner pipe (6) is formed by radial corrugations (7) formed by folding the inner peripheral wall alternately inward and outward. Thus, it is possible to secure a large heat radiation area of the inner pipe (6) to increase the heating efficiency of the fluid (4).

Both the outer pipe (5) and the inner pipe (6) are formed by copper pipes.

Moreover, the following structure is employed in the basic example of the first embodiment shown in FIGS. 1A to 1C.

The only one inner pipe (6) is used and disposed concentrically with the outer pipe (5). The corrugations (7) extending in an axial direction of the outer pipe (5) are in a parallel orientation to a central axis (5c) of the outer pipe (5).

Respective end portions (5a) and (6a) of the outer pipe (5) and the inner pipe (6) are not protruding outside from an end portion (1a) of the holder (1).

First to third variations of the first embodiment shown in FIGS. 2A to 2C will be described.

In the basic example of the first embodiment shown in FIG. 1A, respective end portions (5a), (5b), (6a), and (6b) of the outer pipe (5) and the inner pipe (6) are not protruding outside from end portions (1a) and (1b) of the holder (1).

On the other hand, in the first variation of the first embodiment shown in FIG. 2A, one end portions (5a) and (6a) on the same side of an outer pipe (5) and an inner pipe (6) are protruding outside from one end portion (1a) of a holder (1). In the second variation of the first embodiment shown in FIG. 2B, only one end portion (5a) of an outer pipe (5) is protruding outside from one end portion (1a) of a holder (1). In a third variation of the first embodiment shown in FIG. 2C, only one end portion (6a) of an inner pipe (6) is protruding outside from one end portion (1a) of a holder (1).

In the invention, it is essential only that at least one of the opposite end portions (5a), (5b), (6a), and (6b) of the outer pipe (5) and the inner pipe (6) be protruding outside from the end portion (1a) or (1b) of the holder (1). Thus, the fluid (4) is heated outside the holder (1) as well, which increases the heating efficiency of the fluid (4).

Figure 2C:
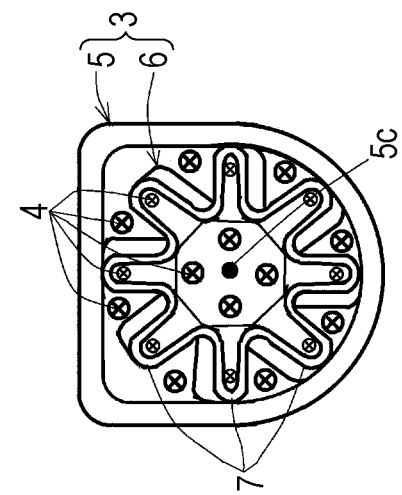
Figure 2B:
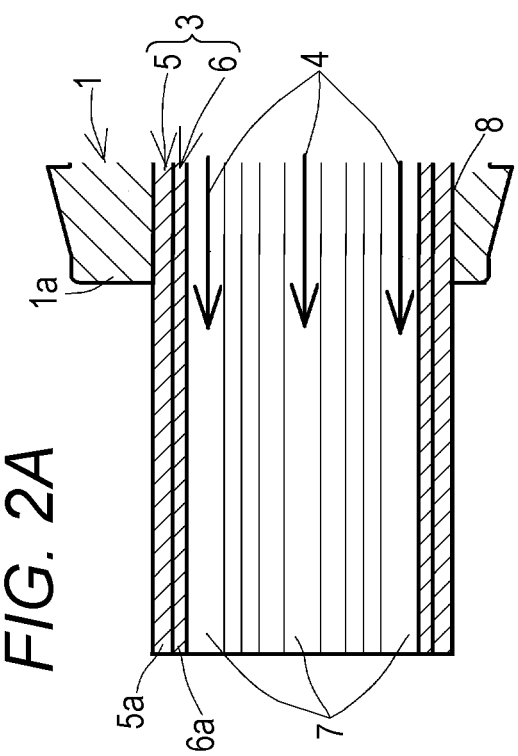

Other structures of the first to third variations of the first embodiment shown in FIGS. 2A to 2C are the same as those of the basic example of the first embodiment shown in FIGS. 1A to 1C.

The fourth variation of the first embodiment shown in FIG. 2D will be described.

In the basic example of the first embodiment shown in FIGS. 1A to 1C and the first to third variations of the first embodiment shown in FIGS. 2A to 2C, the corrugations (7) extending in the axial direction of the outer pipe (5) are in the parallel orientation to the central axis (5c) of the outer pipe (5).

Figure 2D:
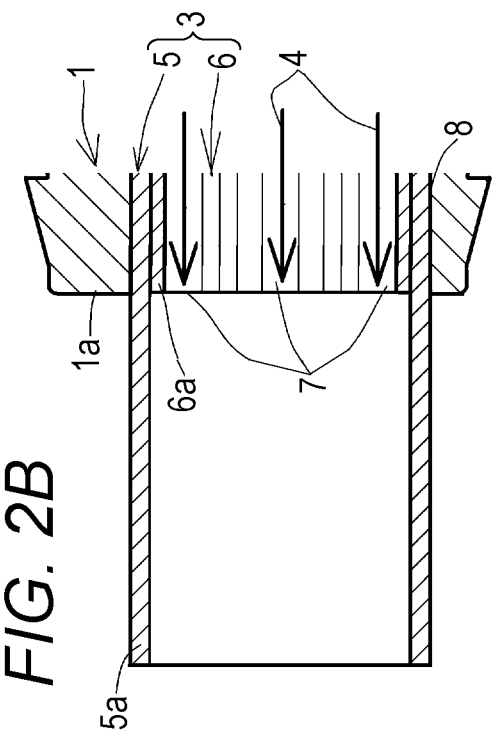

On the other hand, in the fourth variation of the first embodiment shown in FIG. 2D, corrugations (7) extending in an axial direction of an outer pipe (5) diagonally intersect a direction parallel to a central axis (5c) of the outer pipe (5). Thus, it is possible to secure the long corrugations (7) and the large heat radiation area of the inner pipe (6). Moreover, the fluid (4) flowing in the direction parallel to the central axis (5c) of the outer pipe (5) collides with inner and outer faces of the corrugations (7) and is deflected and turbulent flows of the fluid (4) are caused inside and outside the corrugations (7), which facilitates heat transfer to the fluid (4) inside and outside the corrugations (7). For these reasons, it is possible to increase the heating efficiency of the fluid (4).

The corrugations (7) are spirally twisted about the central axis (5c) of the outer pipe (5). The corrugations (7) may be formed by straight corrugations without twists.

Other structures of the fourth variation of the first embodiment shown in FIG. 2D are the same as those of the basic example of the first embodiment shown in FIGS. 1A to 1C.

The structure of the fourth variation of the first embodiment shown in FIG. 2D may be used in combination with structures of the first to third variations of the first embodiment shown in FIGS. 2A to 2C.

A basic example of a second embodiment shown in FIGS. 3A to 3C will be described.

In the basic example of the first embodiment shown in FIGS. 1A to 1C, the only one inner pipe (6) is used and disposed concentrically with the outer pipe (5).

On the other hand, in the basic example of the second embodiment shown in FIGS. 3A to 3C, a plurality of inner pipes (6) are disposed in a bundle in an outer pipe (5). Thus, it is possible to secure a large heat radiation area of the inner pipes (6) to increase the heating efficiency of the fluid (4).

Other structures of the basic example of the second embodiment shown in FIGS. 3A to 3C are the same as those of the basic example of the first embodiment shown in FIGS. 1A to 1C. In FIGS. 3A to 3C, the same components as those in the basic example of the first embodiment will be provided with the same reference signs as in FIGS. 1A to 1C.

First to third variations of the second embodiment shown in FIGS. 4A to 4C will be described.

In the basic example of the second embodiment shown in FIG. 3A, respective end portions (5a) and (6a) of the outer pipe (5) and the inner pipes (6) are not protruding outside from an end portion (1a) of a holder (1).

Figure 4A:
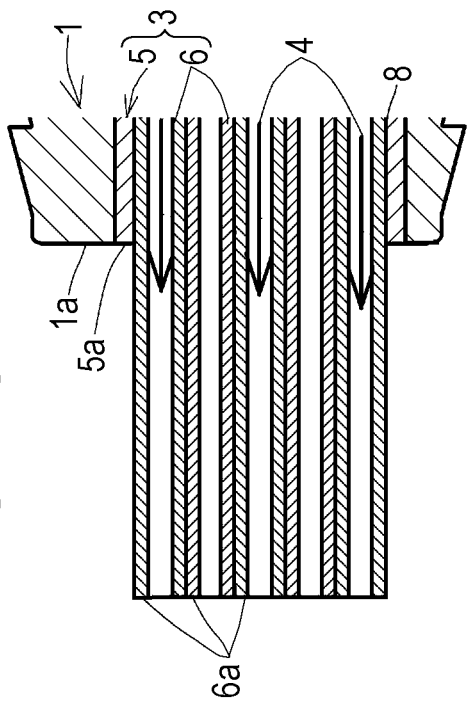

On the other hand, in the first variation of the second embodiment shown in FIG. 4A, one end portions (5a) and (6a) on the same side of an outer pipe (5) and inner pipes (6) are protruding outside from one end portion (1a) of a holder (1). In the second variation of the second embodiment shown in FIG. 4B, only one end portion (5a) of an outer pipe (5) is protruding outside from one end portion (1a) of a holder (1). In a third variation of the second embodiment shown in FIG. 4C, only one end portions (6a) of inner pipes (6) are protruding outside from an end portion (1a) of a holder (1).

In the invention, it is essential only that at least one(s) of the opposite end portions (5a), (5b), (6a), and (6b) of the outer pipe (5) and the inner pipes (6) be protruding outside from the end portion (1a) or (1b) of the holder (1).

Figure 4D:
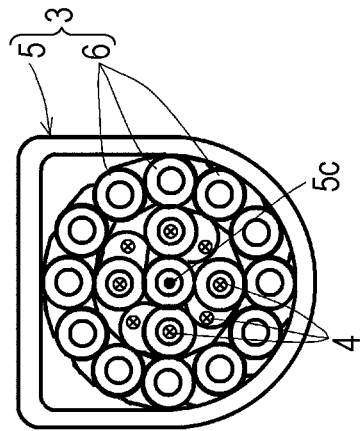
Figure 4C:
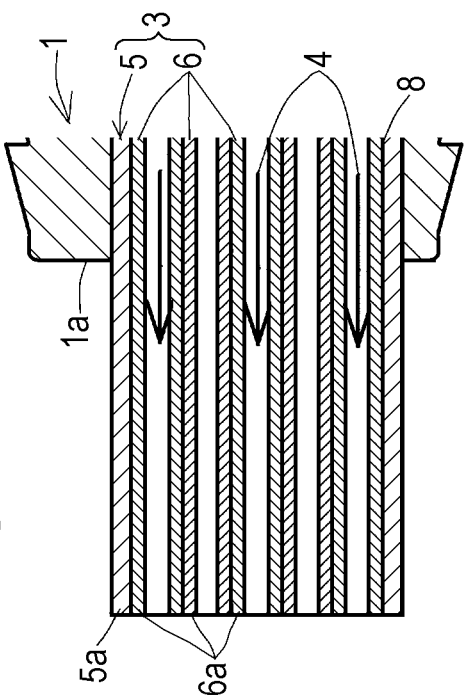
Figure 4B:
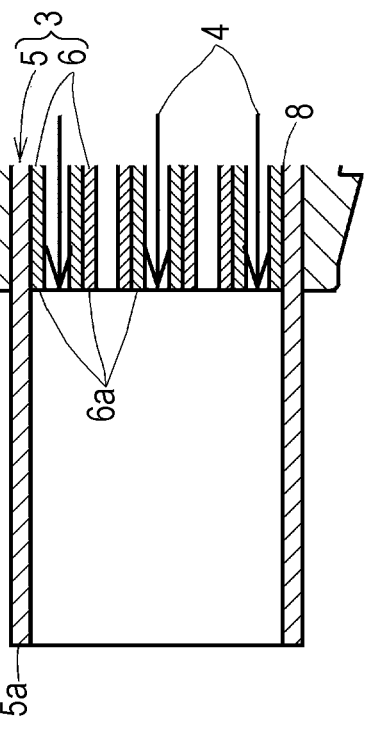

Other structures of the first to third variations of the second embodiment shown in FIGS. 4A to 4C are the same as those of the basic example of the second embodiment shown in FIGS. 3A to 3C.

FIG. 4D shows a fourth variation of the second embodiment.

In the basic example of the second embodiment shown in FIGS. 3A to 3C and the first to third variations of the second embodiment shown in FIGS. 4A to 4C, the inner pipes (6) are in a parallel orientation to a central axis (5c) of the outer pipe (5).

On the other hand, in the fourth variation of the second embodiment shown in FIG. 4D, the inner pipes (6) diagonally intersect a direction parallel to a central axis (5c) of an outer pipe (5). Thus, it is possible to secure the long inner pipes (6) and the large heat radiation area of the inner pipes (6). Moreover, the fluid (4) flowing in the direction parallel to the central axis (5c) of the outer pipe (5) collides with inner and outer faces of the inner pipe (6) and is deflected and turbulent flows of the fluid (4) are caused inside and outside the inner pipes (6), which facilitates heat transfer to the fluid (4) inside and outside the inner pipes (6). For these reasons, it is possible to increase the heating efficiency of the fluid (4).

The inner pipes (6) are spirally twisted about the central axis (5c) of the outer pipe (5). The inner pipes (6) may be formed by straight pipes without twists.

Other structures of the fourth variation of the second embodiment shown in FIG. 4D are the same as those of the basic example of the second embodiment shown in FIGS. 3A to 3C.

The structure of the fourth variation of the second embodiment shown in FIG. 4D may be used in combination with structures of the first to third variations of the second embodiment shown in FIGS. 4A to 4C.

The fluid heating device for the engine in each of the basic examples and the first to fourth variations of the first and second embodiments shown in FIGS. 1A to 4D, with the one end portion (1a) of the holder (1) inserted into a blow-by gas inlet of an oil separator (not shown) and a blow-by gas inlet pipe (not shown) lead out of a breather device (not shown) for the engine connected to the other end portion (1b) of the holder (1), can be used to heat blow-by gas introduced from a breather chamber into an oil separator to thereby prevent freezing of moisture included in the blow-by gas in the oil separator at cold start of the engine and during following warming-up operation to prevent clogging of a blow-by gas route. Moreover, the fluid heating device for the engine, with the one end portion (1a) of the holder (1) inserted into a blow-by gas outlet of the oil separator (not shown) and a blow-by gas outlet pipe (not shown) communicating with a crankcase (not shown) of the engine connected to the other end portion (1b) of the holder (1), can be used to heat the blow-by gas lead out of the oil separator into the crankcase to thereby prevent the freezing of the moisture included in the blow-by gas at the cold start of the engine and the following warming-up operation to prevent the clogging of the blow-by gas route. The fluid heating device for the engine can be disposed at any position in the blow-by gas route, e.g., a midpoint in a blow-by gas reflux pipe.

The fluid heating device for the engine in each of the basic examples and the first to fourth variations of the first and second embodiments shown in FIGS. 1A to 4D, with the one end portion (1a) of the holder (1) inserted into a fuel inlet of a fuel feed pump (not shown) and a fuel inlet pipe (not shown) lead out of a fuel tank (not shown) for the engine connected to the other end portion (1b) of the holder (1), can be used to heat fuel introduced from the fuel tank into the fuel feed pump to thereby prevent freezing of the fuel in the fuel feed pump at the cold start of the engine and during the following warming-up operation to prevent clogging of a fuel route. Moreover, the fluid heating device for the engine, with the one end portion (1a) of the holder (1) inserted into a fuel outlet of the fuel feed pump (not shown) and a fuel outlet pipe (not shown) communicating with a fuel injection pump (not shown) for a diesel engine connected to the other end portion (1b) of the holder (1), can be used to heat the fuel lead out of the fuel feed pump into the fuel injection pump so that the fuel prevents freezing of the moisture included in the blow-by gas at the cold start of the engine and during the following warming-up operation to prevent clogging of the blow-by gas route. The fluid heating device for the engine can be disposed at any position in the fuel route, e.g., a midpoint in a fuel feed pipe.

What is claimed is:

1. A fluid heating device for an engine comprising:
   a holder:
   a heater housed in the holder; and
   a radiator pipe inserted into the holder,
   wherein the radiator pipe is formed by an outer pipe and at least one inner pipe in the outer pipe, heat generated by the heater is transferred to the outer pipe and the inner pipe, a fluid passing inside and outside the inner pipe in the outer pipe is heated by heat radiation from the outer pipe and the inner pipe,
   wherein an outwardly-facing surface of the inner pipe is in contact with an inwardly-facing surface of the outer pipe so that the heat of the heater is transferred to the inner pipe via the outer pipe, and
   wherein the holder and the outer pipe respectively comprise a single straight pipe extending straight over an entire length of the holder and the outer pipe,
   wherein the outer pipe extends over the entire length of the holder in an axial direction of the holder and has a flat outer-pipe wall portion with a flat outwardly-facing outer-pipe surface and a flat inwardly-facing outer pipe surface, the heater is flat in form, partially placed at a respective central part of the holder and the outer pipe in a respective axial direction of the holder and the outer pipe, and placed along the flat outwardly-facing outer-pipe surface, and the inner pipe is in contact with the flat inwardly-facing outer-pipe surface,
   and wherein an outwardly-facing surface at the central part of the outer pipe in the axial direction of the outer pipe comprises a heat receiving face along which the heater extends and a fitting face fitted into the holder, the heat receiving face is formed at a part of an entire circumference of the outwardly-facing surface at the central part of the outer pipe in the axial direction of the outer pipe, and the fitting face is formed at an entire rest part of the entire circumference of the outwardly-facing surface at the central part of the outer pipe in the axial direction of the outer pipe.

2. The fluid heating device for the engine according to claim 1,
   wherein at least one of opposite end portions of the outer pipe and the inner pipe is protruding outside from an end portion of the holder.

3. The fluid heating device for the engine according to claim 1,
   wherein a wall of the inner pipe has radial corrugations formed by folding the wall alternately inward and outward.

4. The fluid heating device for the engine according to claim 3,
   wherein the radial corrugations extend in an axial direction of the outer pipe and are spirally twisted about a central axis of the outer pipe.

5. The fluid heating device for the engine according to claim 1,
   wherein the inner pipe in the outer pipe comprises plurality of inner pipes and the plurality of inner pipes is disposed in a bundle in the outer pipe.

6. The fluid heating device for the engine according to claim 5,
   wherein the inner pipes are spirally twisted about a central axis of the outer pipe.

7. The fluid heating device for the engine according to claim 6,
   wherein at least one of opposite end portions of the outer pipe and at least one, inner pipe of the plurality of inner pipes is protruding outside from an end portion of the holder.

8. The fluid heating device for the engine according to claim 2,
   wherein a wall of the inner pipe has radial corrugations formed by folding the wall alternately inward and outward.

9. The fluid heating device for the engine according to claim 8, wherein the radial corrugations extend in an axial direction of the outer pipe and are spirally twisted about a central axis of the outer pipe.

10. The fluid heating device for the engine according to claim 2,
wherein the inner pipe in the outer pipe comprises a plurality of inner pipes and the plurality of inner pipes is disposed in a bundle in the outer pipe.

* * * * *